United States Patent Office 3,261,817
Patented July 19, 1966

3,261,817
OXIMINO-CONTAINING POLYMERS
Rudolph J. Angelo, Wilmington, Del., assignor to E. I. du Pont de Nemours and Company, Wilmington, Del., a corporation of Delaware
No Drawing. Filed Dec. 12, 1962, Ser. No. 244,017
11 Claims. (Cl. 260—80)

This invention relates to novel polymeric compositions suitable for producing shaped articles.

The invention resides in a polymer composition having a substantially hydrocarbon backbone or chain and having oximino groups either alone or as part of large radicals appended to carbon atoms in the chain.

Specifically, the invention is a substantially linear film-forming polymer having the recurring unit:

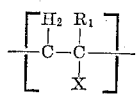

wherein $R_1$ is selected from the group consisting of hydrogen and alkyl of 1 to 4 carbon atoms, preferably methyl and wherein X is the oximino-containing radical preferably selected from the group consisting of

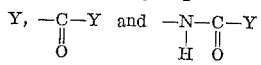

wherein

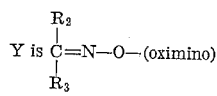

$R_2$ being alkyl of 1 to 6 carbon atoms and $R_3$ being selected from the group consisting of hydrogen, aryl and alkyl of 1 to 6 carbon atoms.

The polymer may be a homopolymer or a copolymer with one or more copolymerizable monomers where the oximino-containing unit, represents at least 1% by weight, preferably at least 50% by weight of the copolymer. As monomers for copolymerization with the oximino-containing monomers any of the following may be used: methyl, ethyl, isobutyl, butyl, octyl and 2-ethylhexyl acrylates and methacrylates; phenyl methacrylate, cyclohexylmethacrylate, p - cyclohexyl - phenylmethacrylate, methoxyethyl methacrylate, chloroethyl methacrylate, 2-nitro-2-phenyl propyl methacrylate and the corresponding esters of acrylic acid; methyl alpha-chloroacrylate, octyl alpha-chloroacrylate, methylisopropenyl ketone, acrylonitrile, methacrylonitrile, methyl vinyl ketone, vinyl chloride, vinyl fluoride, vinylidene fluoride, vinylidene chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, methylene diethyl malonate, acrylamide, methacrylamide or mono-alkyl substitution products thereof, phenyl vinyl ketone, diethyl fumarate, diethyl maleate, methylene diethyl itaconate, dibutyl itaconate, vinyl pyridine, maleic anhydride, ethyl vinyl ether, 2-chloroethyl vinyl ether, divinyl ether, 2-hydroxy ethyl vinyl ether, allyl ethyl ether, 2-methylallyl ethyl ether, 2-methylallyl n-propyl ether, 2-methylallyl, 2'-hydroxyethyl ether, di-(2-methylallyl) ether, 2-chloroallyl ethyl ether, di-(allyloxymethyl) ether, 2-methylallyloxypropylene oxide, isopropyl vinyl ether, n-butyl vinyl ether, isobutyl vinyl ether, 2-ethylhexyl vinyl ether, 2-methoxyethyl vinyl ether, n-propyl vinyl ether, sec-butyl vinyl ether, tert-butyl vinyl ether, n-amyl vinyl ether, isoamyl vinyl ether, n-hexyl vinyl ether, n-decyl vinyl ether, n-octadecyl vinyl ether, isoprene, 2-ethyl-1,3-butadiene, 2-propyl-1,3-butadiene, 2-n-hexyl-1,3-butadiene, 2-cyclohexyl - 1,3 - butadiene, 2-ethoxy - 1,3 - butadiene, 2-phenyl-1,3-butadiene, 3-methyl-1,3-pentadiene, 3-methyl-1,3-hexadiene, 4-methyl-1,3-hexadiene, 3-ethyl-1,3-heptadiene, 3,7-dimethyl-1,3-octadiene, 2-tolyl-1,3-butadiene, 2-xylyl-1,3-butadiene, 1,3-butadiene, 3,4-diethyl-1,5-hexadiene, 3-methyl-1,5-hexadiene, 3,4-dimethyl, 1,5-hexadiene, 3,5-dimethyl-1,6-heptadiene, 4-phenyl-1,6-heptadiene and 4-cyclohexyl-1,6-heptadiene.

The oximino monomer having the formula

wherein $R_1$ and X are as defined previously is prepared by reacting the oximino of a ketone or an aldehyde, e.g. acetone oxime with the unsaturated compound e.g. acrylic ester or halide, vinyl isocyanate, vinyl ether, or the like at a temperature below 20° C. in an organic medium. The organic liquid used may be any of the usual hydrocarbon solvents: pyridine, petroleum ether, benzene, etc. When forming the oximino monomer of a vinyl ether, a catalyst such as a mercuric acetate may be used and the method of transetherification followed. This method is described by W. H. Watanabe and L. E. Conlon, Journal of American Chemical Society, 79, 2828 (1957).

In any case, the reaction is exothermic and an ice bath may be used to prevent undue rise in temperature. After reaction is substantially complete, the resulting mixture is agitated and warmed to about room temperature. The oximino monomer may then be isolated by any of the methods known, e.g. crystallization, extraction, etc.

The oximino monomers that are operable in this invention include those derived from the oximes of diethyl ketone, di-n-propyl ketone, diisopropyl ketone, di-n-butyl ketone, diisobutyl ketone, di-n-amyl ketone, diisoamyl ketone, di-n-hexyl ketone, di-n-heptyl ketone, di-n-octyl ketone, di-n-nonyl ketone, di-n-decyl ketone, di-n-undecyl ketone, di-n-dodecyl ketone, di-n-fridecyl ketone, di-n-pentadecyl ketone, di-n-heptadecyl ketone, methyl ethyl ketone, methyl n-propyl ketone, methyl isopropyl ketone, methyl n-butyl ketone, methyl isobutyl ketone, methyl sec.-butyl ketone, methyl tert.-butyl ketone, ethyl n-propyl ketone, ethyl isopropyl ketone, ethyl n-butyl ketone, methyl n-amyl ketone, methyl n-hexyl ketone, methyl n-heptyl ketone, methyl n-octyl ketone, methyl n-nonyl ketone, methyl n-decyl ketone, ethyl n-amyl ketone, ethyl n-hexyl ketone, ethyl n-heptyl ketone, ethyl n-octyl ketone, ethyl n-nonyl ketone, ethyl n-decyl ketone, methyl thienyl ketone as well as those from oximes of formaldehyde, acetaldehyde, propionaldehyde, n-butyraldehyde, isobutyraldehyde, n - valeraldehyde, isovaleraldehyde, pivalaldehyde, n-caproaldehyde, n-heptaldehyde, n-caprylaldehyde, n-pelargonaldehyde, n-caprinaldehyde, n-undecylaldehyde, n-lauraldehyde, n-tridecanal, n-myristaldehyde, n-palmitaldehyde, n-stearaldehyde, acrolein, crotonaldehyde, aldol, furfural, benzaldehyde, 1-naphthaldehyde, 2-anthraldehyde, thiophenaldehyde.

The process for preparing the homopolymers or copolymers involves subjecting the oximino monomer alone or with at least one copolymerizable monomer, preferably in a liquid hydrocarbon or halogenated hydrocarbon solvent such as hexane, benzene, toluene, tetrachloroethylene, to a temperature of —40° to 300° C. and a pressure of 1–3,000 atmospheres in the presence of a catalyst for a contact time sufficient to form the copolymer, usually at least 20 seconds for a continuous process and at least 3 minutes for a batch process, and then isolating the resulting copolymer.

When high pressures are used, 800 atmospheres and above, a conventional peroxide (di-tertiary-butyl peroxide) or azo catalyst (alpha,alpha'-azobisdicyclohexanecarbonitrile) may be used and the temperature is preferably 25°–175° C. The azo catalysts are preferred since they yield polymers that can be formed into films by pressing, melt extrusion in solvent coating.

It is believed that the essential feature of this type of catalyst, or more properly termed "initiator," is that they are capable of generating free radicals. These free radical initiators, whether they be generated from a peroxide compound or from an azo-type compound combine with a polymerizable monomer to form a new free radical; the new free radical combines with another monomer molecule to form still another free radical; this process is repeated until three is propagated a long polymer chain, as is well known in the art. Polymer chain growth terminates when the free radical-bearing polymer fragment encounters another free radical which, for example, may be another growing polymer chain or an initiator free radical.

Typical peroxides which release free radical to function as initiators include benzoyl peroxide, di-tertiary-butyl peroxide, di-tertiary-butyl peroxydicarbonate, 2,2-bis-(tertiarybutylperoxy) butane, dimethyl dioxide, diethyl dioxide, dipropyl dioxide, propyl ether dioxide and propyl methyl dioxide. Orangic hydroperoxides also applicable are, for example, tertiary-butylhydroperoxide, cumene hydroperoxide, ethyl hydroperoxide, and can be used to initiate polymerizations of this kind. Combinations such as ammonium persulfate with a reducing agent can also be used. Typical azo compounds which decompose to liberate free radicals for initiation of polymerization include such catalysts as alpha,alpha′-azobisdicyclohexanecarbonitrile, alpha,alpha′-azobisisobutyronitrile, triphenylmethylazobenzene, 1,1′ - azodicycloheptanecarbonitrile, alpha,alpha′-azobisisobutyramide, lithium azodisulfonates, magnesium azodisulfonate, dimethyl alpha,alpha′-azodiisobutyrate, alpha,alpha′-azobis(alpha, gamma-dimethylvaleronitrile) and alpha,alpha′-azobis(alpha,beta-dimethylbutyronitrile).

"Coordination" catalysts, as defined in U.S. Patent 2,822,357, may also be used to effect copolymerization. Specifically, such "coordination" catalysts are composed of:

(A) A compound containing at least one metal of the group consisting of metals of Groups IVa, Va and VIa of the Periodic Table, iron, cobalt, copper, nickel and manganese, said metal having directly attached thereto at least one substituent from the group consisting of halogen, oxygen, hydrocarbon and —O-hydrocarbon; and (B) A reducing compound seleced from the group consisting of metal hydrides and compounds having a metal of Groups I, II and III of the Periodic Table, said metal being above hydrogen in the electromotive series, attached directly through a single bond to a carbon atom, said carbon atom selected from the group consisting of trigonal carbon and tetrahedral carbon.

In the above definitions, Periodic Table means Mendeleeff's Periodic Table of the Elements, 25th ed., Handbook of Chemistry and Physics, published by the Chemical Rubber Publishing Co. Specific examples of compound (A) included in the above definition are titanium tetrachloride, titanium tetrafluoride, zirconium tetrachloride, niobium pentachloride, vanadium tetrachloride, vanadyl trichloride, tantalum pentabromide, cerium trichloride, molybdenum pentachloride, tungsten hexachloride, cobaltic chloride, ferric bromide, tetra(2-ethylhexyl)-titanate, tetrapropyl titanate, titanium oleate, octylene glycol titanate, triethanolamine titanate, tetraethyl zirconate, tetra(chloroethyl) zirconate and the like. Specific examples of compound (B) in this definition are phenyl magnesium bromide, lithium aluminum tetraalkyl, aluminum trialkyl dimethyl cadmium, diphenyl tin and the like.

The Friedel-Crafts type catalysts are especially useful for the preparation of polyers from the vinyloxy acetone oximes. Operable catalysts of this type include boron trifluoride, aluminum trichloride, aluminum tribromide, stannic chloride, stannous chloride, ferric chloride, zinc chloride, silicon tetrachloride, as well as complexes of boron trifluoride with dialkyl ethers and carboxylic acids.

Polymerization is preferably carried out in a solvent medium. Among the solvents which have been found useful in the present invention are hydrocarbons and halogenated hydrocarbons: hexane, benzene, toluene, cyclohexane, bromobenzene, chlorobenzene, o-dichlorobenzene, tetrachloroethylene, dichloromethane and 1,1,2,2-tetrachloroethane. Heterocyclic compounds such as tetrahydrofuran, thiophene and dioxane may also be used. In some instances, polymerization may be effected without a solvent or in an emulsion or slurry system.

The invention will be more clearly understood by referring to the examples which follow, Example 1 representing the best mode contemplated for practicing the invention. It is understood that the examples, although illustrating specific embodiments of the present invention, should not be considered limitative of the invention.

*Example 1*

In a reaction flask fitted with stirrer and thermometer and with an ice bath for cooling there was added 31.4 grams (0.3 mole) of methacrylyl chloride and 18.3 grams (0.25 mole) of acetone oxime while the temperature was maintained at 5° C. To this there was added 40 grams of pyridine with cooling. A vigorous reaction took place with the formation of tan-colored crystals. The mixture was stirred for 20 minutes while warming to room temperature and was then poured onto crushed ice containing 350 ml. of 3% hydrochloric acid. The resulting dispersion was separated into two layers, one an oil layer and the other a water layer. The oil was separated and the remaining water layer was extracted four times with ethyl acetate. The oil and the extracts from the water layer were combined and dried over anhydrous calcium sulfate. The solvent was removed by distillation and the remaining liquid was purified by vacuum distillation. There were obtained 25.5 grams (72% of theoretical) of a clear, colorless liquid boiling at 92–94° C. at 8–9 mm. $n_D^{25}$: 1.4597. An infrared spectrum of the liquid showed strong absorption bands at 6.05, 5.75 and 11.2–11.4 microns characteristic of —C=N—, —C=O and —C=CH$_2$.

*Analysis.*—Calculated for $C_7H_{11}O_2N$: C, 59.55; H, 7.85; N, 9.92. Found: C, 59.48; H, 7.82; N, 8.65, 9.91.

The product was methacryloxyacetone oxime.

A small glass vial was evacuated, flushed with nitrogen and filled with 6 grams of methacryloxyacetone oxime and 0.03 gram of azobisisobutyronitrile. The vial was sealed and kept in a constant temperature bath at 60° C. for two days. After about 15 hours the liquid had almost completely solidfied and was slightly yellow. After two days the vial was broken and a light-yellow hard glassy rod of polymer was obtained. The yield was quantitative.

The polymer was dissolved in dimethylacetamide, precipitated into heptane and washed with heptane to give 4.47 grams of a light yellow colored powder. The polymer had an inherent viscosity (0.5 gram in 100 ml. of dimethylacetamide) of 0.59. The polymer was dissolved in dimethylacetamide and cast on a glass plate to give a sparkling clear film. The films were stiff and self-supporting. An infrared spectrum of the film indicated the polymethacryloxyacetone oxime structure. The film was readily dyeable and had low static susceptibility.

*Example 2*

Acetone oxime (14.6 grams of 0.2 mole) was dissolved in a mixture of 200 ml. of petroleum ether and 50 ml. of benzene. The solution was cooled to 5° C. in an ice bath and 13.8 grams (0.2 mole) of freshly prepared vinyl isocyanate was added over a period of five minutes during which the temperature rose to 25° C. After the vinyl isocyanate was added the ice bath was removed and the solution was allowed to warm to room temperature. The solution became cloudy and finally a clear oil separated. The oil was crystallized by cooling to give a white solid. The solid was washed with cold petroleum ether and vacuum dried to yield 21.4 grams (75.5% of theoretical) of product melting at 44–45° C. Recrystallization of this solid product from ethyl acetate/petroleum ether gave a white crystalline solid melting at 45–46° C. An infrared spectrum absorption bands at 6.05 and 11.2–11.4 microns characteristic of the vinyl urethane of acetone oxime.

*Analysis.*—Calculated for $C_6H_{10}N_2O_3$: C, 50.69; H, 7.09; N, 19.71. Found: C, 50.97; H, 7.31; N, 19.67.

Following the polymerization procedure described in Example 1, the vinyl urethane of acetone oxime (2.0 grams in 10 ml. of benzene with 0.01 gram of azobisisobutyronitrile) was polymerized at 75° C. for two days and gave a solid product which could be pressed into a stiff film which could be readily dyed and printed.

*Example 3*

The monomer was prepared by reaction of acetone oxime with vinyl n-butyl ether in the presence of mercuric acetate as catalyst following the method of transetherification described by W. H. Watanabe and L. E. Conlon, J. Am. Chem. Soc. 79, 2828 (1957). Elementary analysis and infrared absorption confirmed the liquid product as vinyloxy acetone oxime.

Vinyloxy acetone oxime was polymerized by the reaction of boron trifluoride catalyst. Boron trifluoride was bubbled into a solution of five grams of vinyloxy acetone oxime in 50 ml. of petroleum ether at 25° C. at a rate of 10 ml./minute for 10 minutes. The solution was then warmed to 75° C. for six hours. The polymeric product was pressed at 125° C. into a clear, stiff film. Inherent viscosity of the polymer was 0.48 (0.1 g. in 100 ml. of dimethylacetamide at 30° C.).

*Examples 4–16*

Following the general procedure described in Example 1, the following homo- and copolymerizations were carried out. The results are shown in tabular form in the table below.

What is claimed is:

1. A linear film-forming polymer having the recurring unit:

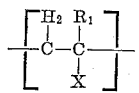

wherein $R_1$ is selected from the group consisting of hydrogen and alkyl of 1 to 4 carbon atoms; and X is an oximino-containing radical selected from the group consisting of

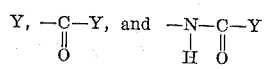

Y having the formula

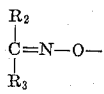

$R_2$ being alkyl of 1 to 6 carbon atoms, and $R_3$ being selected from the group consisting of hydrogen, aryl and alkyl of 1 to 6 carbon atoms.

2. A polymer as in claim 1 wherein $R_1$ is methyl.

3. A polymer as in claim 1 wherein said oximino-containing recurring units represent at least 1% by weight of the polymer.

4. A polymer as in claim 1 wherein said oximino-containing recurring units represent at least 50% by weight of the polymer.

5. A self-supporting film of a polymer having the recurring unit:

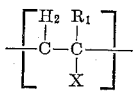

wherein $R_1$ is selected from the group consisting of hydrogen and alkyl of 1 to 4 carbon atoms; and

| Example | Monomer | Initiator | Temperature-Time | Remarks |
|---|---|---|---|---|
| 4 | 4.0 g. MAAO | 0.05 g. Benzoyl Peroxide | 75° C.-5 hours | Stiff films from solvent casting and melt pressing, inherent viscosity, 0.14.[a] |
| 5 | 0.9 g. MAAO, (1 ml. benzene) | 0.02 g. Benzoin methyl-ether, UV light. | 25° C.-24 hours | Clear films from viscous solution, inherent viscosity, 0.16.[b] |
| 6 | 3.0 g. MAAO, 3.0 g. Ethyl Acrylate. | 0.03 g. azo | 65° C.-2 days | Clear flexible films, inherent viscosity 0.33.[a] Nitrogen analysis indicated 50 mole percent combined ethyl acrylate. |
| 7 | 1.5 g. MAAO, 1.5 g. Styrene | 0.05 g. azo | 60° C.-5 days | Product has 55 mole percent styrene, clear films, inherent viscosity, 0.25.[a] |
| 8 | 3.0 g. MAAO 3.0 g. Acrylonitrile. | 0.03 g. azo | 65° C.-4 days | Clear, slightly yellow films, nitrile and ester absorption shown in infrared, inherent viscosity, 0.42.[b] |
| 9 | 1.5 g. MAAO, 1.5 g. Vinyl Acetate. | 0.05 g. azo | 75° C.-3 days | Tacky polymer shows good adhesive characteristics. |
| 10 | 4.0 g. VUAO, 2.0 g. Methyl Methacrylate. | 0.05 g. azo | 60° C.-2 days | Clear films, inherent viscosity, 0.35,[b] good dyeability.[c] |
| 11 | 3.5 g. VUAO, 2.5 g. Vinyl Pyrollidone. | 0.04 g. azo | 60° C.-2 days | Clear, stiff films, good dyeability.[c] |
| 12 | 3.0 g. MAAO, 2.0 g. Methyl Vinyl Ketone. | 0.02 g. Benzoyl Peroxide | 75° C.-5 hours | Flexible film, good adherability to inks and dyes. |
| 13 | 3.5 g. VOAO, 2.5 g. Styrene | 0.03 g. azo | 65° C.-3 days | Clear film, good dyeability. |
| 14 | 2.5 g. VUAO, 1.5 g. Butadiene. | 0.03 g. azo | 60° C.-2 days | Clear, flexible film, good adherability to inks, low static susceptibility. |
| 15 | 1.0 g. MAAO, 5.0 g. Vinyl Chloride. | 0.02 g. Acetyl Benzoyl Peroxide. | 40° C.-18 hours | Stiff film, low static susceptibility. |
| 16 | 3.0 g. VUAO, 3.0 g. Vinylidene Fluoride. | 0.03 Azo | 40° C.-24 hours | Clear, tough film, low static susceptibility. |

Legend—
Azo=Azobisisobutyronitrile.
[a] =1.5 grams in 100 ml. of dimethyl formamide at 30° C.
[b] =0.5 gram in 100 ml. of dimethylacetamide at 30° C.
[c] =Treated with 3% aqueous solution of "Latyl" Red M.G. (E. I. du Pont de Nemours & Co.), 2 hrs. at 90°.
MAAO=Methacryloxyacetone Oxime.
VOAO=Vinyloxyacetone Oxime.
VUAO=Vinyl Urethane of Acetone Oxime.

X is an oximino-containing radical selected from the group consisting of $$Y, \ -\underset{\underset{O}{\|}}{C}-Y, \ \text{and} \ -\underset{H}{\overset{}{N}}-\underset{\underset{O}{\|}}{C}-Y$$

Y having the formula $$\underset{R_3}{\overset{R_2}{\underset{|}{C}}}=N-O-$$

$R_2$ being alkyl of 1 to 6 carbon atoms, and
$R_3$ being selected from the group consisting of hydrogen, aryl and alkyl of 1 to 6 carbon atoms.

6. A linear film-forming copolymer of $$CH_2=\underset{X}{\overset{R_1}{\underset{|}{C}}}$$

wherein
$R_1$ is selected from the group consisting of hydrogen and alkyl of 1 to 4 carbon atoms, and
X is an oximino-containing radical selected from the group consisting of $$Y, \ -\underset{\underset{O}{\|}}{C}-Y, \ \text{and} \ -\underset{H}{\overset{}{N}}-\underset{\underset{O}{\|}}{C}-Y$$

Y having the formula $$\underset{R_3}{\overset{R_2}{\underset{|}{C}}}=N-O-$$

$R_2$ being alkyl of 1 to 6 carbon atoms, and
$R_3$ being selected from the group consisting of hydrogen, aryl and alkyl of 1 to 6 carbon atoms, and an alkyl acrylate; said oximino-containing radicals being present in at least 1% by weight of said copolymer.

7. A linear film-forming copolymer of $$CH_2=\underset{X}{\overset{R_1}{\underset{|}{C}}}$$

wherein
$R_1$ is selected from the group consisting of hydrogen and alkyl of 1 to 4 carbon atoms, and
X is an oximino-containing radical selected from the group consisting of $$Y, \ -\underset{\underset{O}{\|}}{C}-Y \ \text{and} \ -\underset{H}{\overset{}{N}}-\underset{\underset{O}{\|}}{C}-Y$$

Y having the formula $$\underset{R_3}{\overset{R_2}{\underset{|}{C}}}=N-O-$$

$R_2$ being alkyl of 1 to 6 carbon atoms, and
$R_3$ being selected from the group consisting of hydrogen, aryl and alkyl of 1 to 6 carbon atoms; and acrylonitrile; said oximino-containing radicals being present in at least 1% by weight of said copolymer.

8. A linear film-forming copolymer of $$CH_2=\underset{X}{\overset{R_1}{\underset{|}{C}}}$$

wherein
$R_1$ is selected from the group consisting of hydrogen and alkyl of 1 to 4 carbon atoms, and
X is an oximino-containing radical selected from the group consisting of $$Y, \ -\underset{\underset{O}{\|}}{C}-Y, \ \text{and} \ -\underset{H}{\overset{}{N}}-\underset{\underset{O}{\|}}{C}-Y$$

Y having the formula $$\underset{R_3}{\overset{R_2}{\underset{|}{C}}}=N-O-$$

$R_2$ being alkyl of 1 to 6 carbon atoms, and
$R_3$ being selected from the group consisting of hydrogen, aryl and alkyl of 1 to 6 carbon atoms; and styrene; said oximino-containing radicals being present in at least 1% by weight of said copolymer.

9. A process which comprises subjecting at least one monomer having the formula $$CH_2=\underset{X}{\overset{R_1}{\underset{|}{C}}}$$

wherein
$R_1$ is selected from the group consisting of hydrogen and alkyl of 1 to 4 carbon atoms, and
X is an oximino-containing radical selected from the group consisting of $$Y, \ -\underset{\underset{O}{\|}}{C}-Y, \ \text{and} \ -\underset{H}{\overset{}{N}}-\underset{\underset{O}{\|}}{C}-Y$$

Y having the formula $$\underset{R_3}{\overset{R_2}{\underset{|}{C}}}=N-O-$$

$R_2$ being alkyl of 1 to 6 carbon atoms, and
$R_3$ being selected from the group consisting of hydrogen, aryl and alkyl of 1 to 6 carbon atoms in an inert organic solvent to a temperature of $-40°$ C. to $300°$ C. and a pressure of 1 to 3,000 atmospheres in the presence of a free radical initiating catalyst for a contact time sufficient to polymerize said monomer; and thereafter isolating the resulting polymer.

10. A process as in claim 9 wherein said catalyst is alpha,alpha'-azobisdicyclohexanecarbonitrile.

11. A linear film-forming copolymer of $$CH_2=\underset{X}{\overset{R_1}{\underset{|}{C}}}$$

wherein
$R_1$ is selected from the group consisting of hydrogen and alkyl of 1 to 4 carbon atoms, and
X is an oximino-containing radical selected from the group consisting of $$Y, \ -\underset{\underset{O}{\|}}{C}-Y \ \text{and} \ -\underset{H}{\overset{}{N}}-\underset{\underset{O}{\|}}{C}-Y$$

Y having the formula $$\underset{R_3}{\overset{R_2}{\underset{|}{C}}}=N-O-$$

$R_2$ being alkyl of 1 to 6 carbon atoms, and
$R_3$ being selected from the group consisting of hydrogen, aryl and alkyl of 1 to 6 carbon atoms; and a vinyl ester selected from the group consisting of vinyl acetate, vinyl propionate and vinyl chloroacetate; said oximino-containing radicals being present in at least 1% by weight of said copolymer.

(References on following page)

References Cited by the Examiner

UNITED STATES PATENTS 3,037,969   6/1962   Hankins et al. _____ 260—86.1

FOREIGN PATENTS 1,054,619   4/1959   Germany.
848,826   9/1960   Great Britain.

OTHER REFERENCES

Walling: Free Radicals in Solution, John Wiley and Sons, Inc. (1957), page 513.

Donaruma: J. Org. Chem., vol. 26, pages 577–9 (1961).

JOSEPH L. SCHOFER, *Primary Examiner.*

DONALD E. CZAJA, *Examiner.*

H. WONG, *Assistant Examiner.*